United States Patent [19]
Kim

[11] Patent Number: 5,930,219
[45] Date of Patent: Jul. 27, 1999

[54] OPTICAL PICKUP DEVICE FOR DISCS OF VARYING CHARACTERISTICS

[75] Inventor: Young Sik Kim, Seoul, Rep. of Korea

[73] Assignee: LG Electronics Inc., Seoul, Rep. of Korea

[21] Appl. No.: 08/774,673

[22] Filed: Dec. 26, 1996

Related U.S. Application Data

[30]       Foreign Application Priority Data

Dec. 29, 1995  [KR]    Rep. of Korea ................... 67352/1995

[51] Int. Cl.$^6$ ....................................................... G11B 7/00
[52] U.S. Cl. ............................................ 369/109; 369/112
[58] Field of Search ..................................... 369/109, 103, 369/112, 44.12, 44.23, 94, 275.1, 118

[56]                   References Cited

U.S. PATENT DOCUMENTS 5,446,565  8/1995  Komma et al. .......................... 369/112
5,495,461  2/1996  Komma et al. .......................... 369/103
5,594,713  1/1997  Komma et al. .......................... 369/112
5,638,353  6/1997  Takahashi ................................ 369/112

*Primary Examiner*—Tan Dinh

[57]                   ABSTRACT

An improved optical pickup apparatus which is capable of reading data from and writing the same in discs each having a different recording density and thickness by using only one optical pickup apparatus by controlling the numerical aperture of an objective lens by using a Liquid Crystal Shutter (LCS) and a diffraction hologram. The apparatus includes a diffraction direction conversion member for converting a diffraction direction of a beam from a laser diode, which beam advances toward an optical disc, a diffraction member for selectively diffracting the beam passed through the diffraction direction conversion member in accordance with a diffraction state, and an objective lens for focusing the beam from the diffraction member on the optical disc.

17 Claims, 18 Drawing Sheets

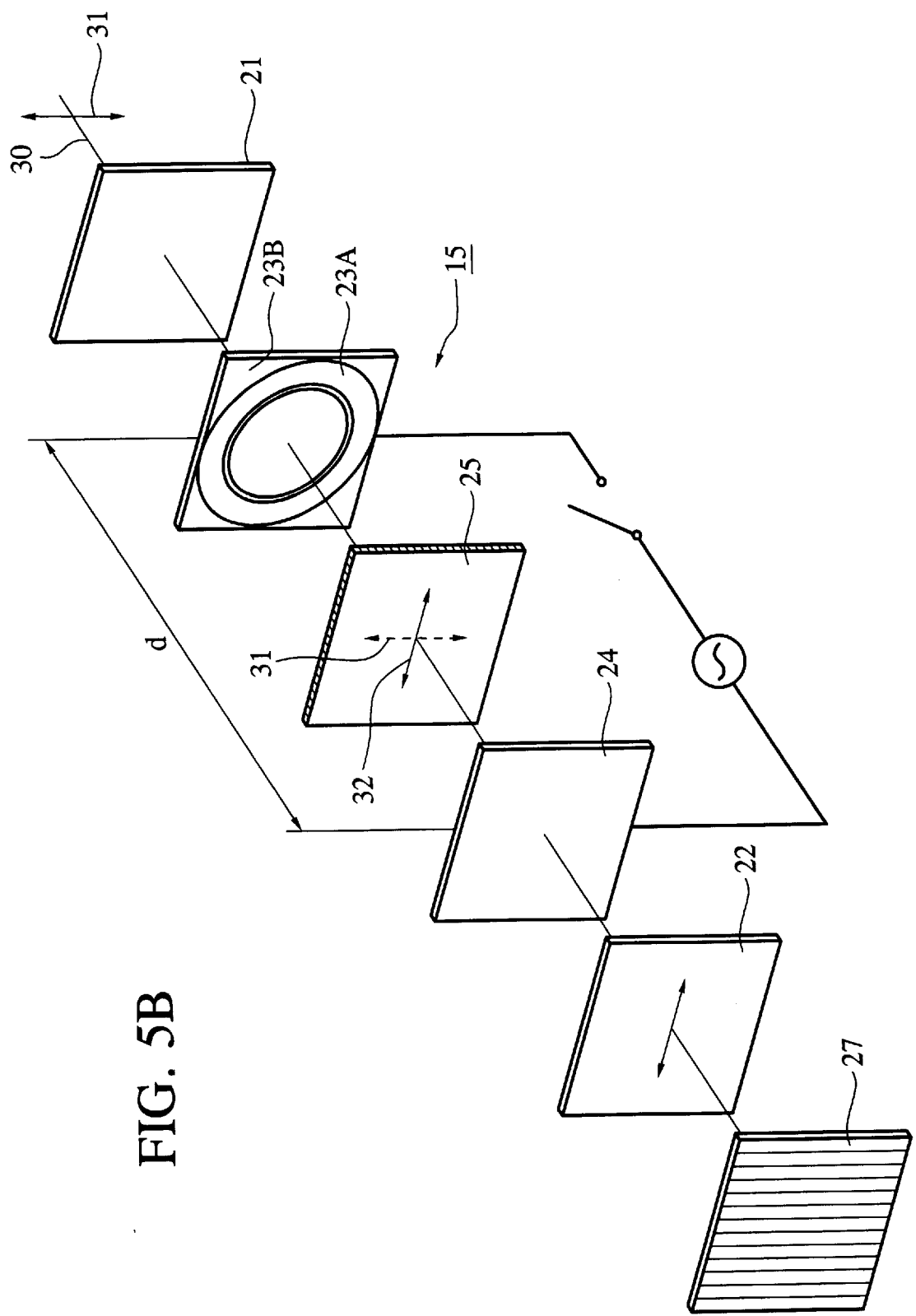

| | $\eta$ max | $d/\Lambda$ |
|---|---|---|
| /\/\/\/\ | 99.0 | 2.10 |
| ∿∿∿ | 95.9 | 1.75 |
| ⊓⊔⊓⊔ | 88.5 | 1.55 |
| ////// | 51.0 | 2.10 |
| \\\\\\ | 50.6 | 2.10 |

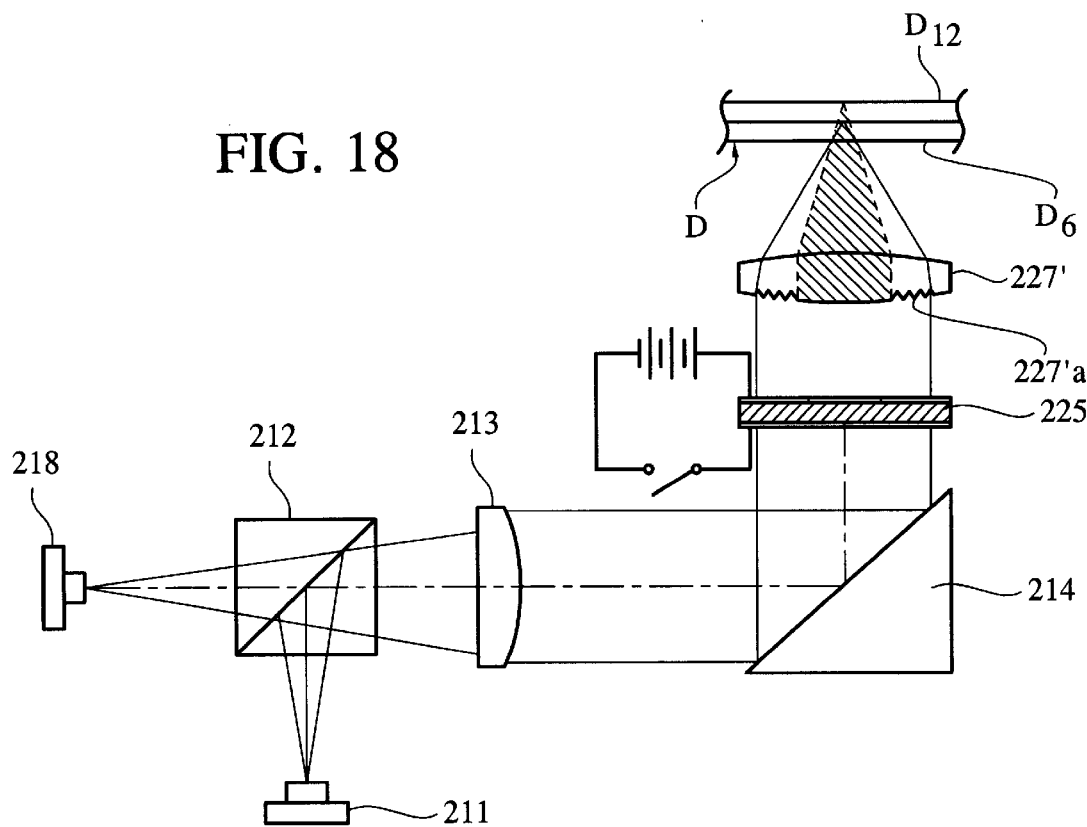
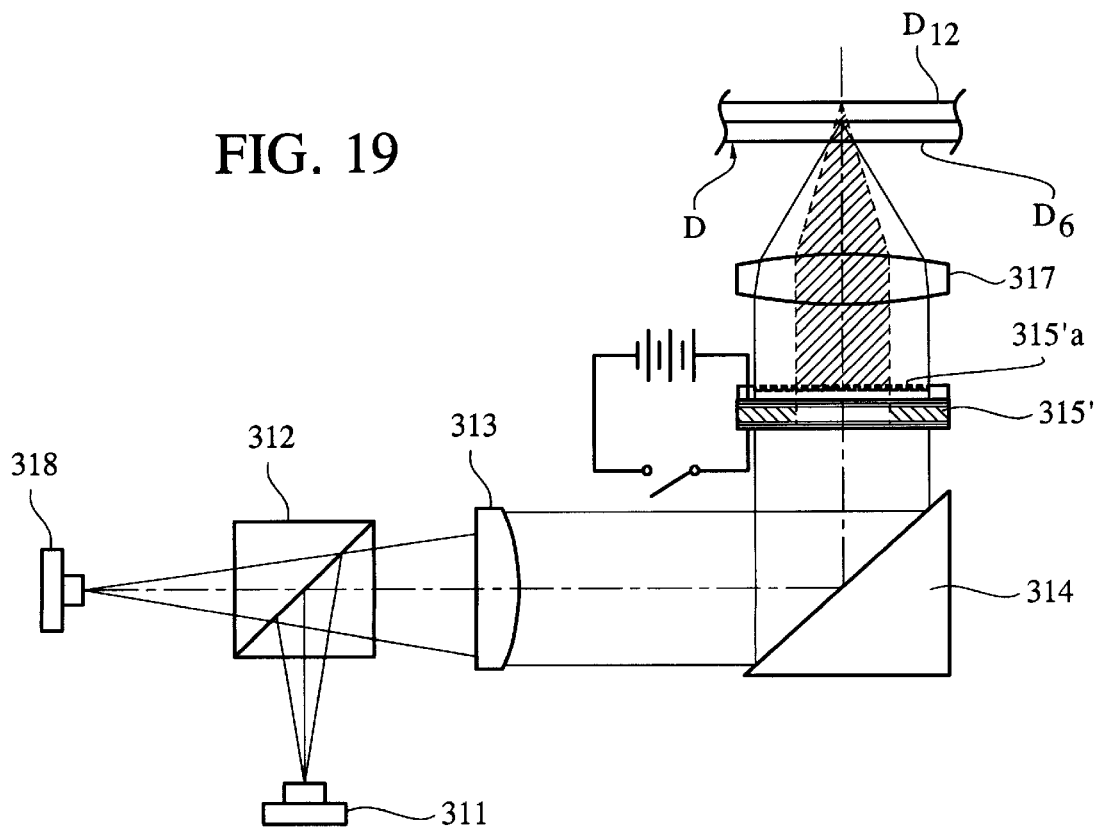

OPTICAL PICKUP DEVICE FOR DISCS OF VARYING CHARACTERISTICS

BACKGROUND OF THE INVENTION

1. Field of the Invention

The present invention relates to an optical pickup apparatus, and in particular to an improved optical pickup apparatus which is capable of reading data from and writing the same onto discs each having a different recording density and thickness by selectively varying the numerical aperture of an objective lens using a liquid crystal shutter (LCS) and a diffraction hologram.

2. Description of the Conventional Art

FIG. 1 is a view illustrating the construction of a conventional optical pickup apparatus.

As shown in FIG. 1, a diffraction grating 2 is arranged beside a laser diode 1, which generates a laser beam, for dividing the beam from the laser diode 1 into a main beam and two sub-beams for a tracking servo.

In addition, an objective lens 4 is arranged beside a collimator lens 3 for focusing the parallel light from the collimator lens 3 on an optical disc D.

A beam splitting prism 5 is arranged between the diffraction grating 2 and the collimator lens 4 for transmitting the incident beam from the diffraction grating 2 at a predetermined ratio and for reflecting the beam reflected in accordance with the information written on the optical disc D.

A sensor lens 6 is arranged below the beam splitting prism 5 for condensing the beam reflected by the beam splitting prism 5, and an optical detector 7 is arranged for detecting a data signal of the beam passed through the sensor lens 6.

With the above-described construction, the beam from the laser diode 1 passes through the diffraction grating 2 and the beam splitting prism 5. The beam is then converted into a parallel light by the collimator lens 3 and focused by the objective lens 4. Thereafter, the beam is reflected or diffracted in accordance with the data recorded on the surface of the optical disc D.

The beam reflected from the surface of the optical disc D passes through the objective lens 4 and the collimator lens 3, and is reflected by the beam splitting prism 5 and detected by the optical detector 7 through the sensor lens 6.

In the conventional optical pickup apparatus, however, when a high density optical disc such as a Digital Video Disk (DVD) is used, the recording density is increased 6–8 times compared to using the optical disc of a conventional CD type. In order to reproduce data recorded on the high density discs, the numerical aperture of the objective lens 4 must be about 0.6. Therefore, the conventional optical pickup apparatus is inadequate to record and reproduce data on and from such discs.

In addition, the conventional optical pickup apparatus has the following problems which occur when reproducing data recorded on a high density optical disc, such as a DVD having a thickness of 0.6 mm, and an optical disc, such as a CD having a thickness of 1.2 mm.

FIG. 2 shows in a solid line the beam strength distribution when the beam is focused on the surface of the optical disc D having a thickness of 0.6 mm, using the objective lens 4 with a numerical aperture NA of 0.6. The objective lens is designed so that the beam can be focused on the surface of an optical disc D having the thickness of 0.6 mm.

In the beam strength distribution when focusing the beam on the optical disc D having a thickness of 1.2 mm by using the objective lens 4, the beam strength ratio of a main lobe is significantly reduced compared to the DVD having a thickness of 0.6 mm, and the beam strength of a side lobe is relatively increased, so that a crosstalk of the signal recorded on a neighboring track is increased.

For example, when reading data recorded on the optical disc (the conventional CD type) having a thickness of 1.2 mm and a track pitch of 1.6 μm by using the objective lens 4 having a numerical aperture of 0.6, the crosstalk is increased by more than −20 dB.

Finally, when using the objective lens 4 having a numerical aperture (NA) of 0.6 in order to focus the beam on the surface of the optical disc D having a thickness of 0.6 mm, the spherical aberration with respect to the optical disc is significantly increased compared to the case where the optical disc having a thickness of 1.2 mm is used.

Therefore, it is impossible to stably reproduce the data recorded on the optical disc (the CD type) having a thickness of the 1.2 mm and on the DVD having a thickness of 0.6 mm by using the same conventional optical pickup apparatus.

SUMMARY OF THE INVENTION

Accordingly, it is an object of the present invention to provide an optical pickup apparatus which overcomes the above and other problems encountered in the conventional art.

It is another object of the present invention to provide an optical pickup apparatus which is capable of reading data from and writing the same onto discs having different recording densities and thicknesses, by using only one optical pickup apparatus and by controlling the numerical aperture of an objective lens using a liquid crystal shutter (LCS) and a diffraction hologram.

To achieve the above and other objects, there is provided an optical pickup apparatus which includes a polarization member for converting a polarization of a beam from a laser diode, the beam advancing toward an optical disc, a diffraction member for selectively diffracting the beam passed through the polarization member in accordance with a diffraction state, and an objective lens for focusing the beam from the diffraction member onto the optical disc.

Additional advantages, objects and features of the invention will become more apparent from the description which follows.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed descriptions.

BRIEF DESCRIPTION OF THE DRAWINGS

The present invention will become more fully understood from the detailed description given hereinbelow and the accompanying drawings which are given by way of illustration only, and thus are not limitative of the present invention, wherein:

FIG. 5B is an exploded view illustrating the construction of another LCS for an optical pickup apparatus according to the first embodiment of the present invention;

FIG. 18 is a view illustrating another example of an optical pickup apparatus of FIG. 17 according to the second embodiment of the present invention;

FIG. 19 is a view illustrating a construction of an optical pickup apparatus according to a third embodiment of the present invention;

DETAILED DESCRIPTION OF THE PREFERRED EMBODIMENTS

Figure 1:
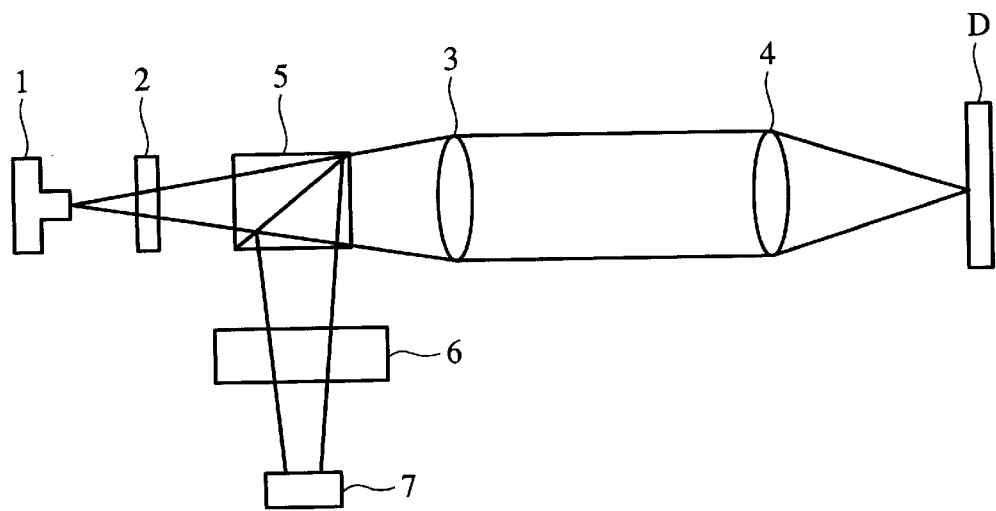
FIG. 1 is a view illustrating the construction of a conventional optical pickup apparatus.
Figure 2:
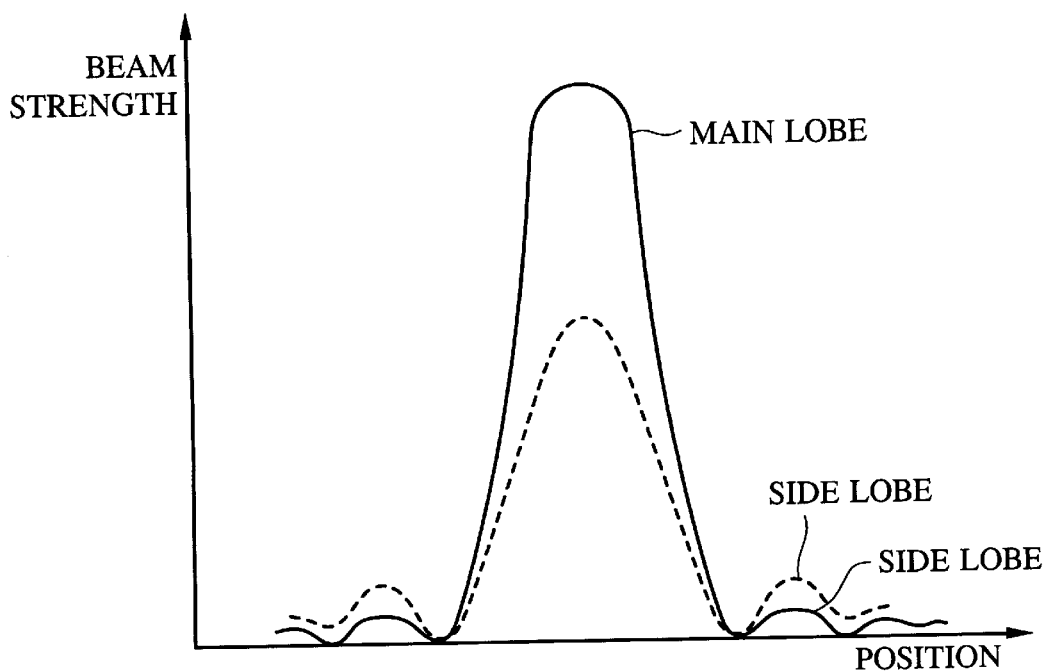
FIG. 2 is a graph of a beam strength distribution of optical discs having different thicknesses in the conventional art.
Figure 3:
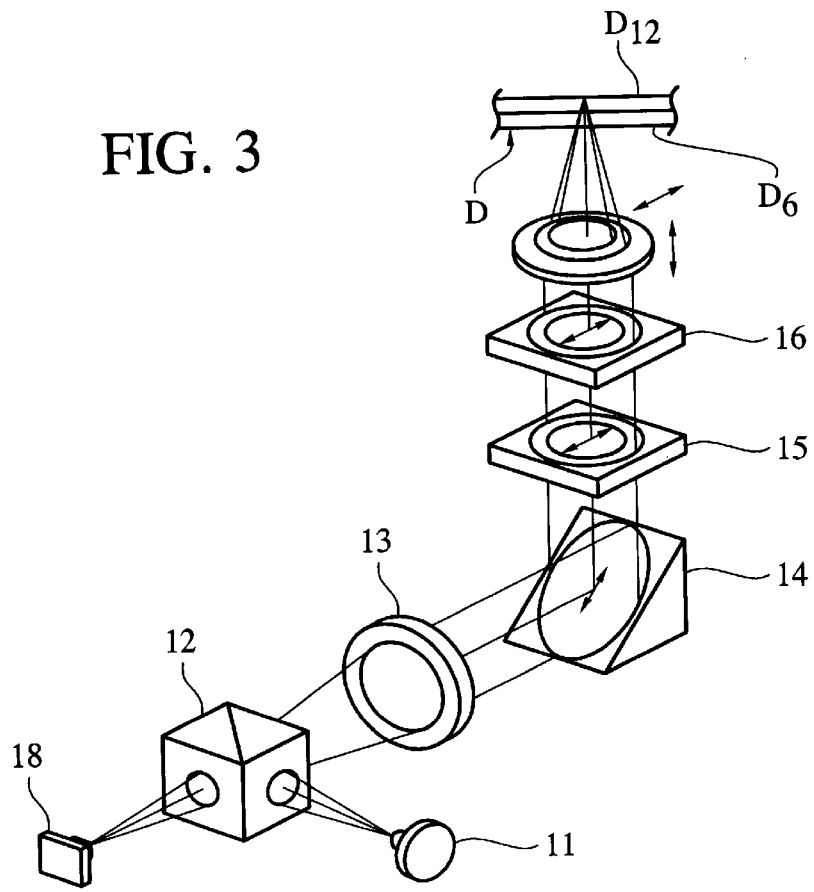
FIG. 3 is a perspective view illustrating an optical pickup apparatus according to a first embodiment of the present invention.
Figure 4:
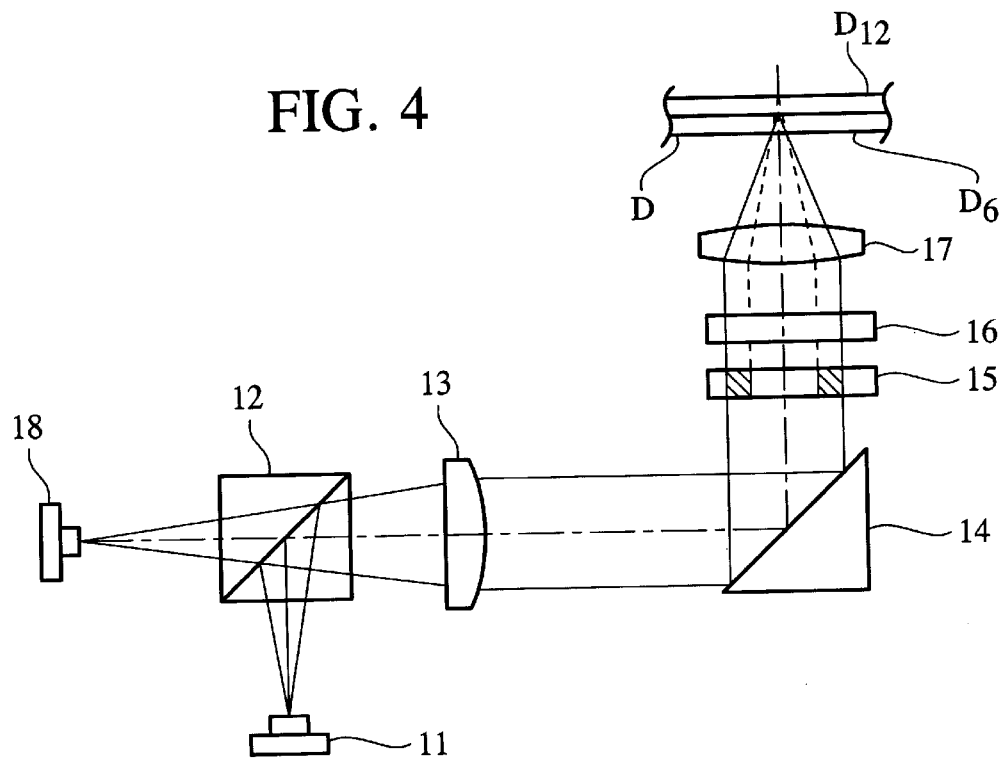
FIG. 4 is a view illustrating the construction of an optical pickup apparatus according to the first embodiment of the present invention.

FIG. 3 is a perspective view illustrating an optical pickup apparatus according to the first embodiment of the present invention, and FIG. 4 is a cut-away view illustrating the optical pickup apparatus of FIG. 3 according to the first embodiment of the present invention.

As shown in FIGS. 3 and 4, a laser diode 11 generates beams with different wavelengths and the beam splitter 12 is arranged beside the laser diode 11 for reflecting a beam having a specific wavelength among the beams from the laser diode 11.

A collimator lens 13 is arranged beside the beam splitter 12 for converting the beam reflected by the beam splitter 12 into a parallel beam, with the collimator lens 13 being vertical with respect to the laser diode 11.

A right-angled triangular prism 14 is arranged beside the collimator lens 13 for reflecting the parallel beam from the collimator lens 13 in a predetermined direction.

A liquid crystal shutter (LCS) (hereinafter called "a liquid crystal plate") is arranged above the right-angled triangular prism 14 for converting an S-wave into a P-wave and a P-wave into an S-wave. The parallel beam reflected by the right-angled triangular prism 24 includes the S-wave and P-wave.

A diffraction hologram 16 is arranged above the liquid crystal plate 15 for selectively diffracting the beam from the liquid crystal plate 15 in accordance with the diffraction state of hologram 16. An objective lens 17 and an optical disc D are arranged in order above the diffraction hologram 16, so that the beam from the diffraction hologram 16 is focused on the optical disc D by the objective lens 17. Here, $D_{12}$ denotes a CD type optical disc, and $D_6$ denotes a DVD type optical disc.

In addition, an optical detector 18 is arranged beside the beam splitter 12 for converting the optical signal corresponding to the beam reflected from the optical disc D into an electrical signal, and for outputting a video or audio signal. The beam splitter 12 transmits the beam from the collimator lens 13 onto the optical detector 18 and reflects the beam from the laser diode 11 onto the collimator lens 13.

The construction of the liquid crystal plate 15 according to the present invention will now be explained in more detail.

Figure 5A:
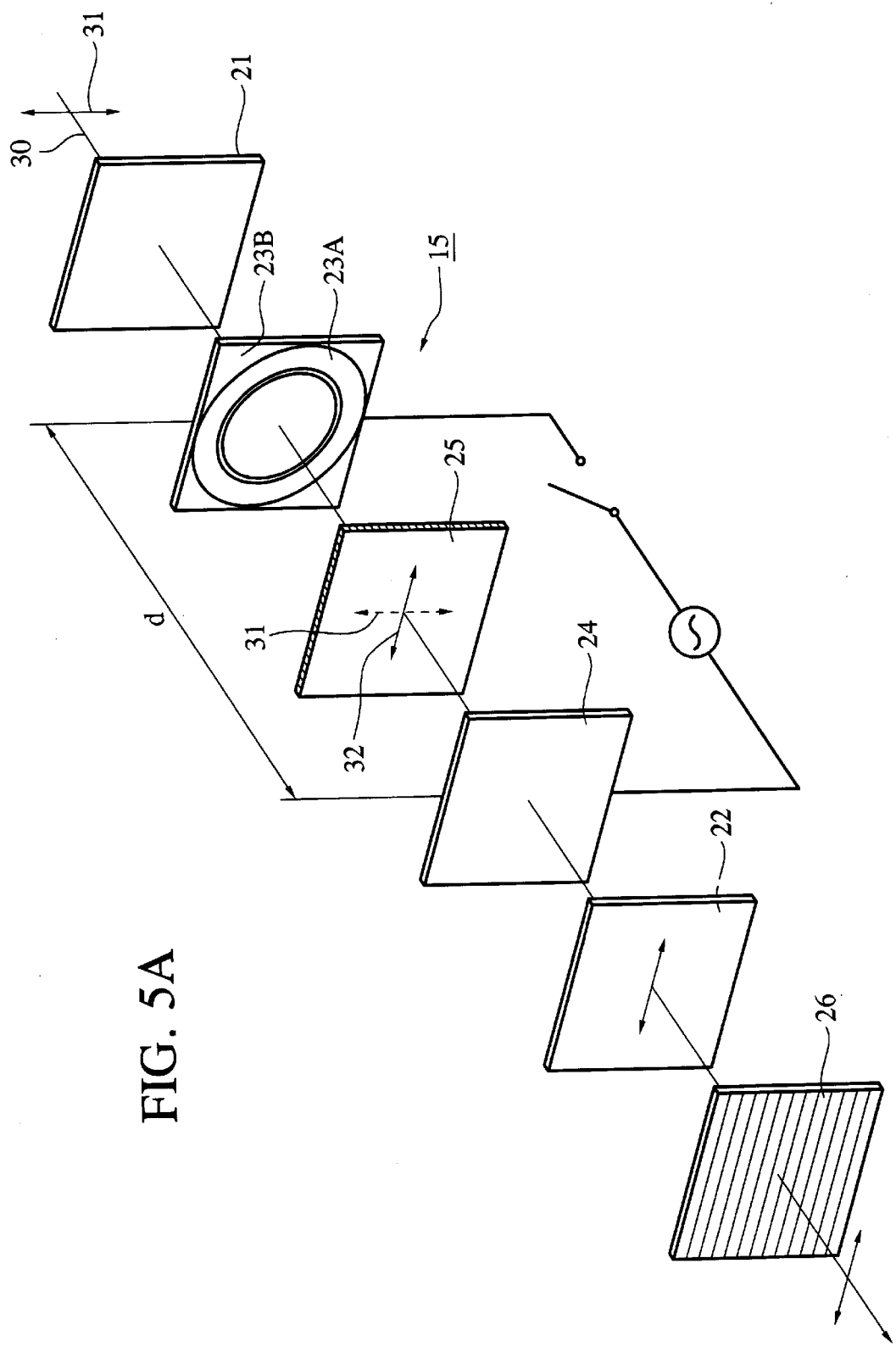
FIG. 5A is an exploded view illustrating the construction of a liquid crystal shutter (LCS) for the optical pickup apparatus according to the first embodiment of the present invention.
Figure 6:
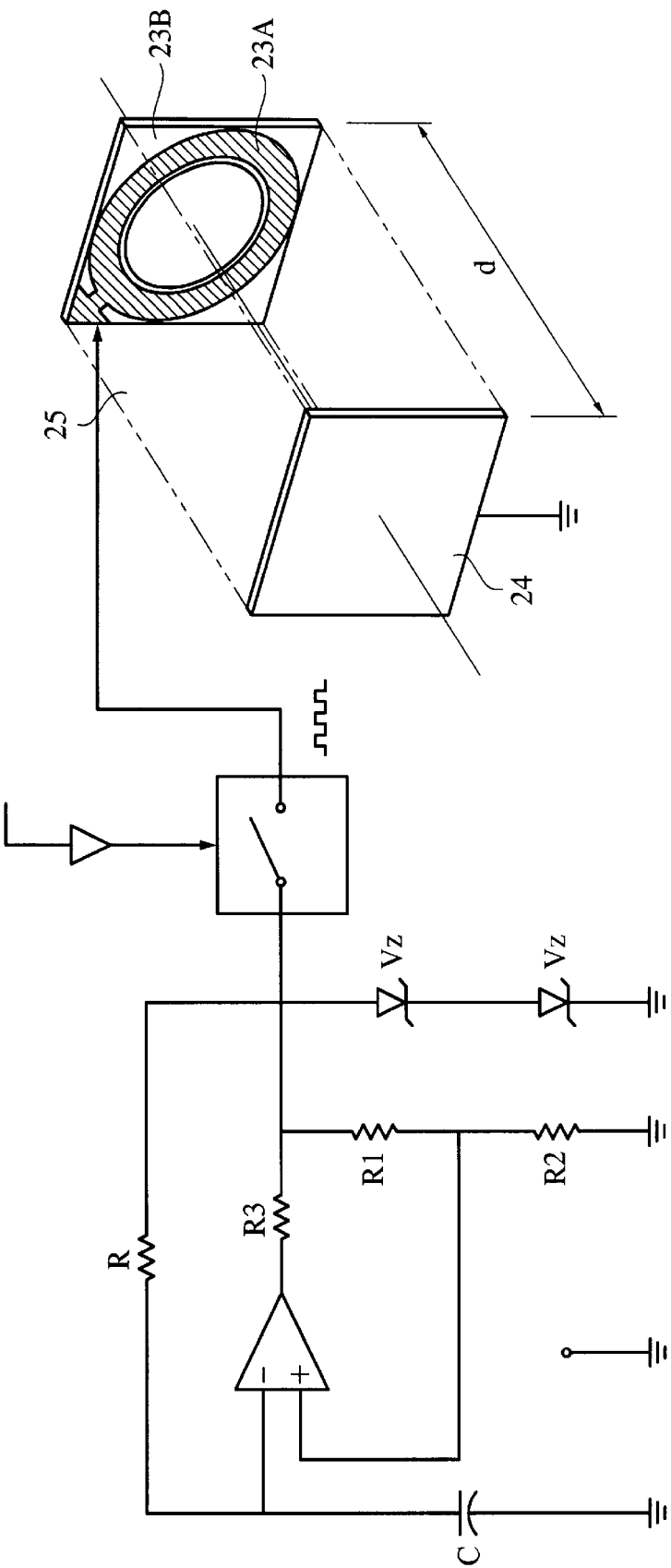
FIG. 6 is a view illustrating an example of a voltage being applied to an LCS of the optical pickup apparatus according to the first embodiment of the present invention.
Figure 7B:
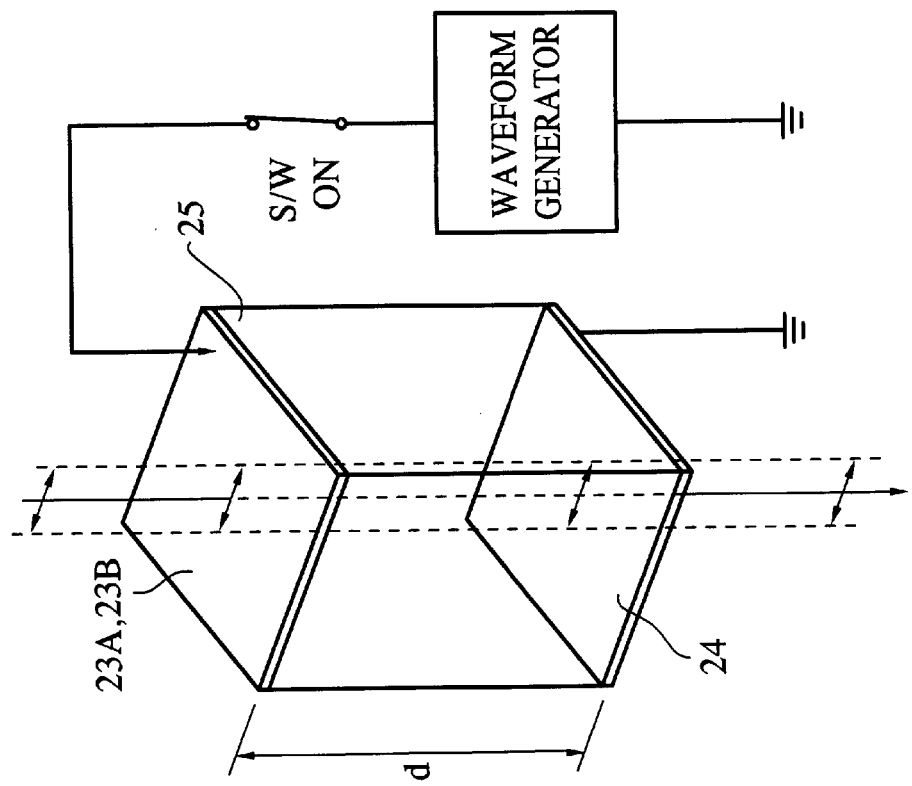
FIG. 7B is a view illustrating the polarization direction of a TN liquid crystal where a voltage is supplied to the liquid crystal of a liquid crystal layer of an optical pickup apparatus according to the first embodiment of the present invention.

FIGS. 5A and 5B show examples of the liquid crystal plate 15, and FIGS. 6–7B are views for explaining the operation of the liquid crystal plate 15 according to the embodiments of the present invention.

As shown in FIGS. 5A through 7B, transparent electrodes 23A and 24 are patterned between transparent plates 21 and 22 in accordance with the size and shape of the beam which is to be controlled. The beam is output from a polarization plate 26(27).

Figure 8A:
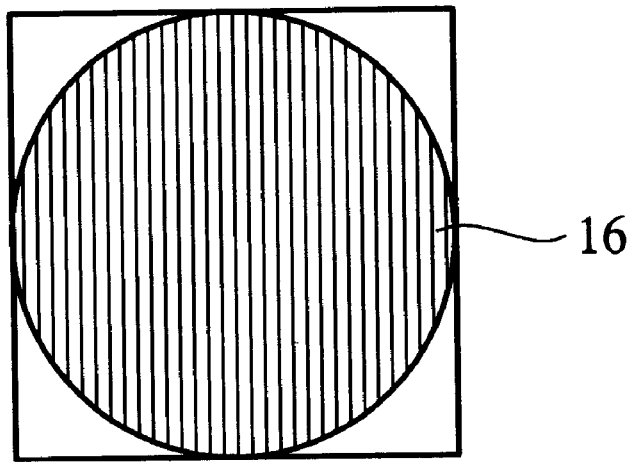
FIG. 8A is a front view illustrating a circular diffraction hologram for an optical pickup apparatus according to the first embodiment of the present invention.
Figure 8B:
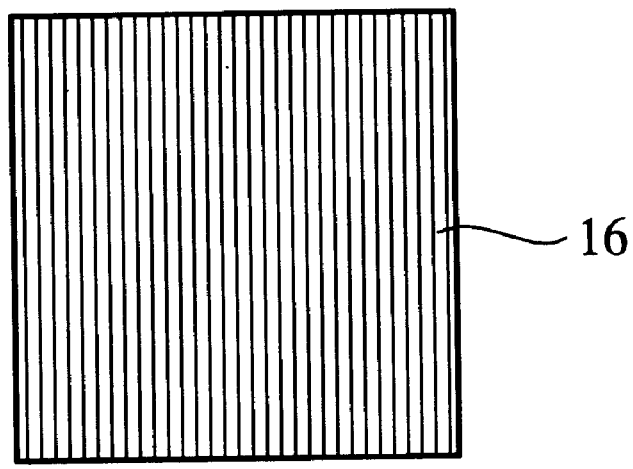
FIG. 8B is a front view illustrating a square shaped diffraction hologram for an optical pickup apparatus according to the first embodiment of the present invention.

Here, the transparent electrode 23A is circular (i.e., ring-shaped), so that a liquid crystal layer 25 is preferably circular. The shape of the diffraction hologram 16 may be circular with an interference pattern, as shown in FIG. 8A, or square as shown in FIG. 8B.

The diffraction hologram 16 is composed of a glass such as BK7 as a medium, $LiNbO_3$ as a non-linear medium, and a liquid crystal.

The transparent electrodes 23A, 23B, and 24 formed between the transparent substrates 21 and 22, as shown in FIG. 6, are spaced-apart from each other with the distant "d". The transparent electrode 24 is connected to GND and a square pulse is supplied to the circular transparent electrode 23A, causing the liquid crystal molecules in the liquid crystal to orient themselves in a certain direction.

A method for computing the distance "d" will now be explained wherein the diffraction ratio of an ordinary beam is "No" with respect to the wavelength λ, and the diffraction ratio of an extraordinary beam is "Ne". Namely, an m-order minimum condition of the distance "d" can be expressed as follows:

$$d=(\sqrt{(2m)^2-1})\lambda/2\delta n \quad (1)$$

where λ denotes the wavelength, and δn denotes the difference between two diffraction ratios.

If the distance "d" is determined, TN liquid crystal is provided on the liquid crystal layer 25 formed in the region corresponding to the computed distance "d".

Figure 7A:
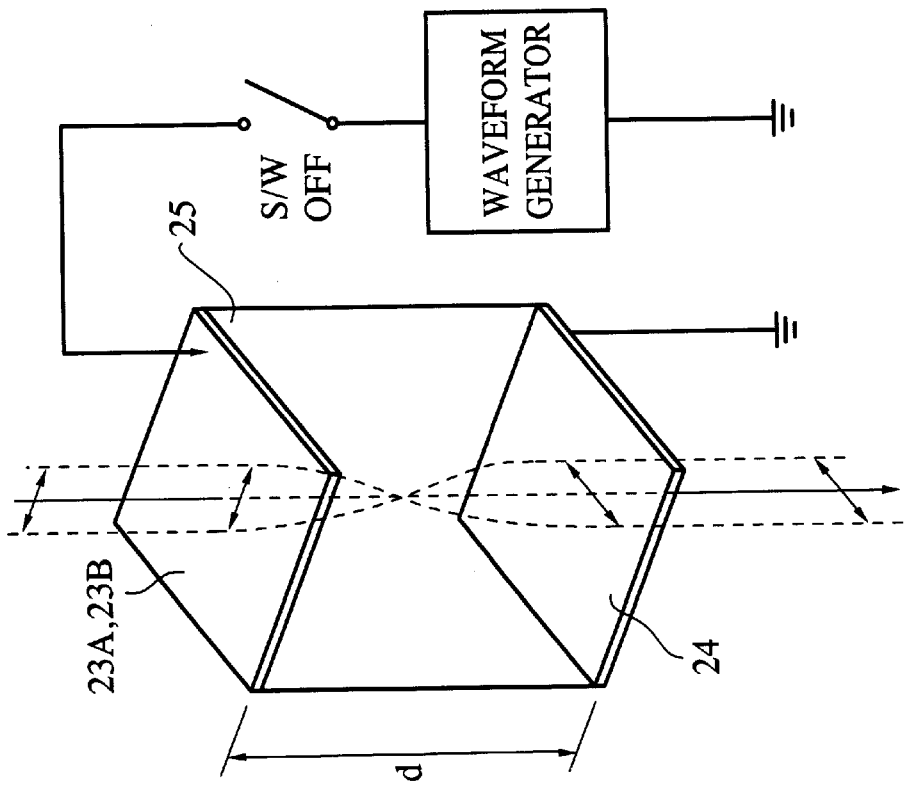
FIG. 7A is a view illustrating a change in the polarization direction of a TN liquid crystal in a state where a voltage is not supplied to the liquid crystal of a liquid crystal layer of an optical pickup apparatus according to the first embodiment of the present invention.

FIG. 7B illustrates that there is no variation in the polarization direction of the TN liquid crystal when a voltage is supplied to the transparent electrode 23A, 23B, and 24 of the liquid crystal plate 15. On the other hand, FIG. 7A shows the variation of a polarization direction in a TN liquid crystal layer when a voltage is not supplied to the liquid crystal molecules in the liquid crystal layer. When a voltage is not supplied across the transparent electrodes, the polarization direction of the laser beam incident on the liquid crystal layer 25 is changed by 90 degrees.

Figure 9A:
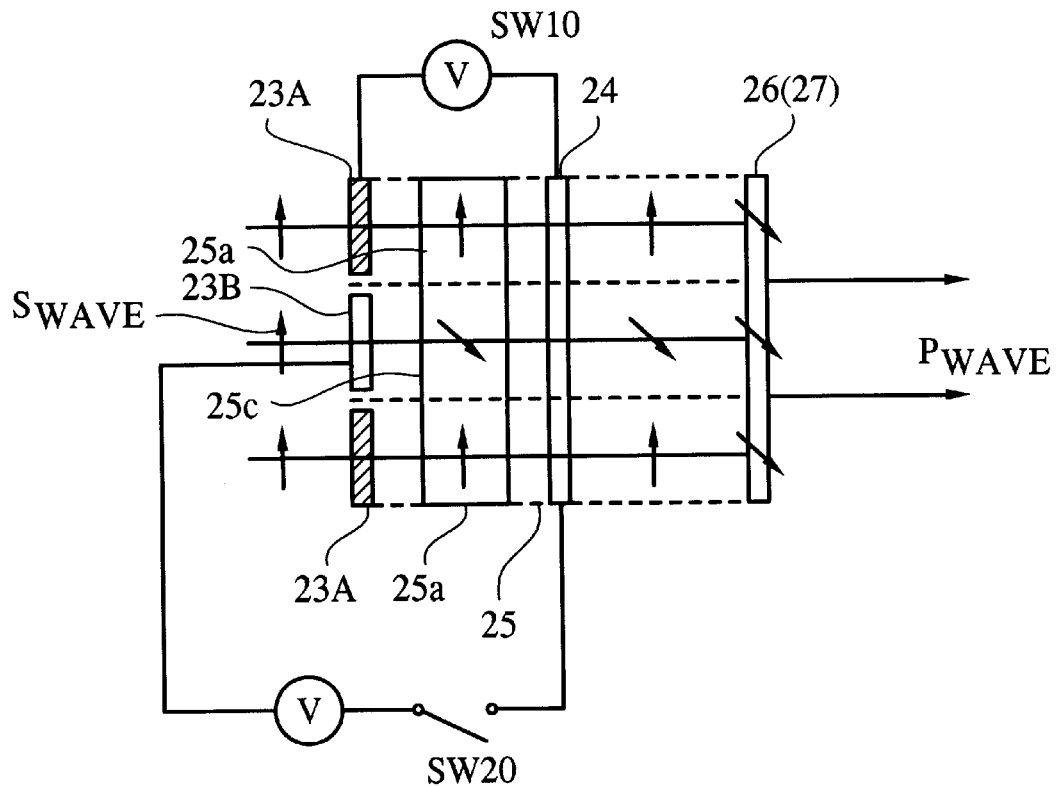
FIG. 9A is a view illustrating an electrode of an LCS to which a voltage is supplied in the normal white (NW) mode for an optical pickup apparatus according to the first embodiment of the present invention.

As shown in FIG. 9A, the TN liquid crystal layer 25 includes portions 25a and 25c to which the voltage is supplied. The portions 25a and 25c are defined by circularly forming the pattern of the transparent electrode 23A wherein the voltage is supplied to the portion 25a.

As shown in FIG. 9A, the polarization direction of the liquid crystal layer to which the voltage is supplied remains the same so that the incident beam (S-wave) passes through the liquid crystal layer; however, in the liquid crystal layer to which the voltage is not supplied, the polarization direction is changed by 90°, so that the incident beam (S-wave) is changed to the P-wave and the P-wave is output from that portion of the liquid crystal layer.

Figure 9B:
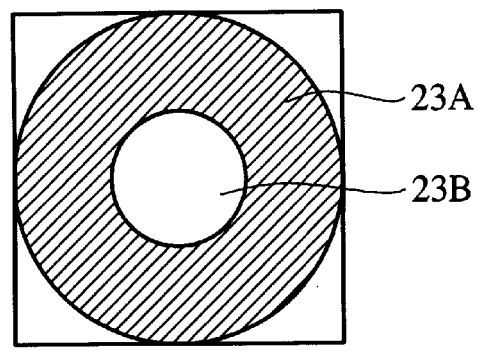
FIG. 9B is a front view of the electrode of the LCS of FIG. 9A.

Namely, after the circular transparent electrode 23A (FIG. 9B) is patterned on the liquid crystal layer 25, a liquid crystal is provided in the liquid crystal layer 25. Thereafter, the voltage is supplied to the transparent electrodes 23A and 24. The S-wave which was made incident to the portion 25C of the liquid crystal layer to which the voltage is not supplied is changed to the P-wave, and the incident S-wave passing through the portions of 25a of the liquid crystal to which the voltage is supplied remains unchanged.

In more detail, the beam through the liquid crystal is made incident on the diffraction hologram 16 which is a diffraction member. Since the diffraction hologram 16 has a rotation efficiency of 0 (zero) with respect to the S-wave, the S-wave passes through the diffraction hologram 16 as unchanged. Then the beam corresponding to the DVD is transferred to the objective lens 17 and is focused on the disk D. On the other hand, the diffraction hologram 16 diffracts the P-wave, thus blocking the P-wave from advancing toward the disc D.

Figure 9C:
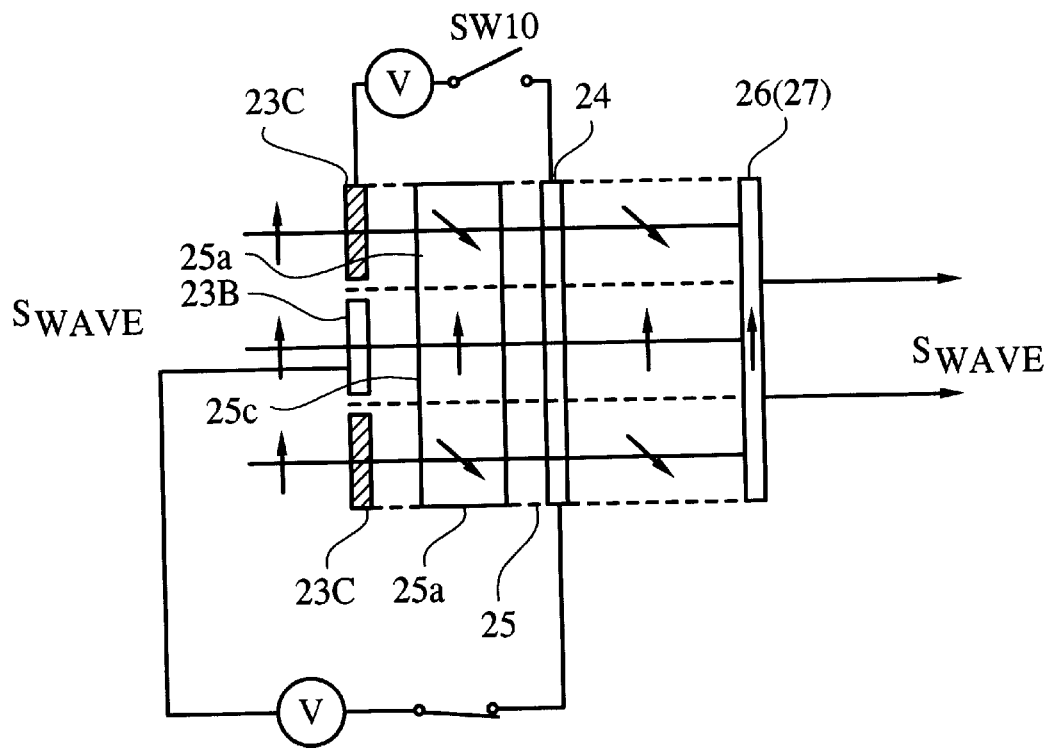
FIG. 9c is a view illustrating an electrode of an LCS to which a voltage is supplied in the normal black (NB) mode for an optical pickup apparatus according to the first embodiment of the present invention.
Figure 9D:
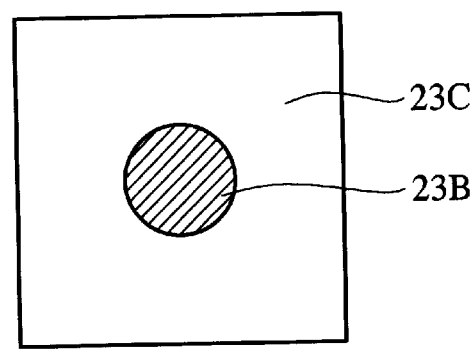
FIG. 9D is a front view of the electrode of the LCS of FIG. 9C.

FIGS. 9C and 9D show the optical pickup apparatus according to the first embodiment of the present invention during the normal black (NB) mode. When a voltage is applied to the terminals of the liquid crystal shutter, the polarization direction of a laser beam which passes through the transparent electrode 23B shown in FIG. 9D is unchanged, but the polarization direction of a laser beam passing through the transparent electrode 23C is changed. With the S-wave incident on the transparent electrodes 23B and 23C, only the S-wave passes through the central portion of the polarization plate 26(27).

Figures 10, 11:
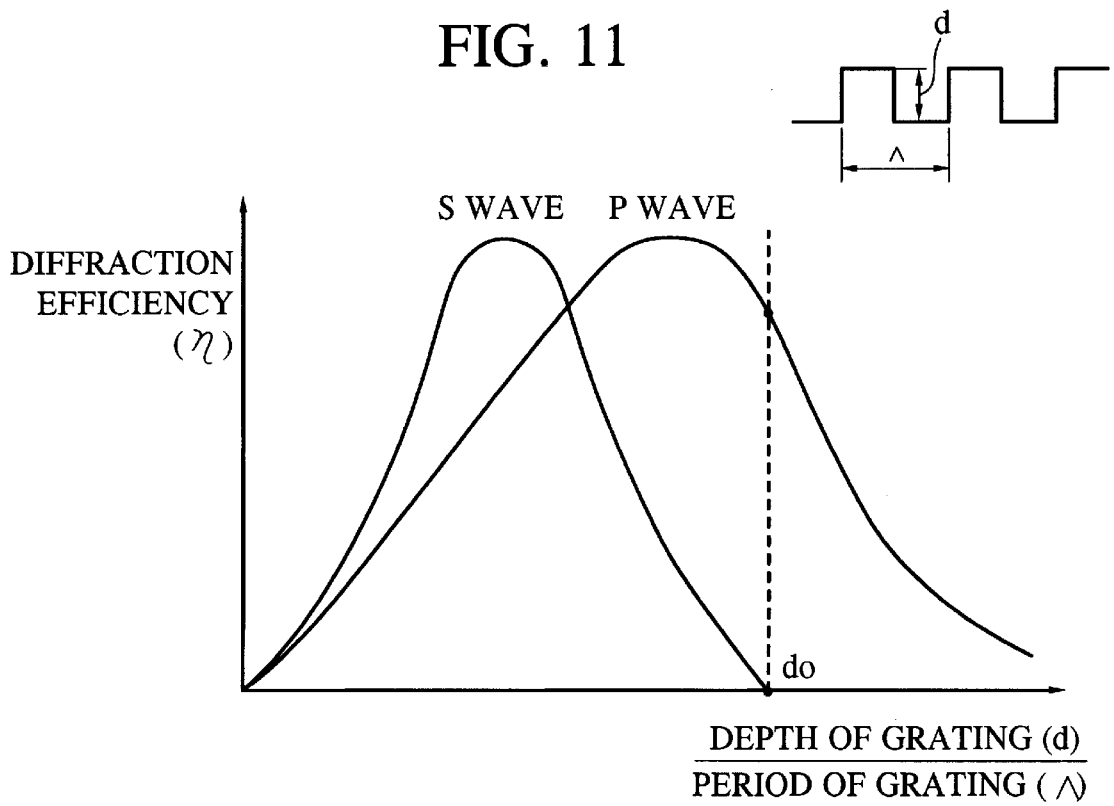
FIG. 10 is a table illustrating a diffraction efficiency varying based on a grating shape of a diffraction hologram for an optical pickup apparatus according to the first embodiment of the present invention.
FIG. 11 is a graph illustrating a diffraction efficiency of a diffraction state of a diffraction hologram for an optical pickup apparatus according to the first embodiment of the present invention.

In addition, the diffraction hologram 16 adapted to the optical pickup apparatus according to the first embodiment of the present invention, as shown in FIGS. 10 and 11, can control the diffraction efficiency based on the shape and depth of grating and a diffraction state.

For example, when the grating on the diffraction hologram 16 is formed to have a depth of $d_0$ as shown in FIG. 11, the S-wave is not affected by the diffraction efficiency. In the case of the P-wave, since the diffraction efficiency is high, a large diffraction occurs in the P-wave. Therefore, the P-wave is not made incident on the objective lens 17, thus decreasing the numerical aperture NA of the objective lens 17.

FIG. 10 is a table containing a diffraction efficiency based on a grating shape of a diffraction hologram for an optical pickup apparatus according to the first embodiment of the present invention.

As shown in FIG. 10, the table includes the maximum transmission efficiency ($\eta_{max}$) of a 1st order based on the shape of various gratings. In the table, the incident angle of the S-wave satisfies the Bragg condition ($\theta=30°$), wherein d denotes the depth of the grating, $\Lambda$ denotes the period of the grating, and $\lambda$ is 780 nm.

Therefore, the optical pickup apparatus according to the first embodiment of the present invention is directed to recording and reproducing data from different optical discs, such as discs $D_{12}$ and $D_6$, each having a different recording density and a different thickness, by properly varying the numerical aperture NA of the objective lens 17, using the liquid crystal plate 15 which polarizes the beam and using the diffraction hologram 16 which changes the diffraction state of the beam.

In addition, the beam converted into the parallel beam by the collimator lens is focused on the surface of the optical disc D by the objective lens 17, for obtaining a desired beam size. This beam size is varied in accordance with the size of the beam which is made incident on the objective lens 17.

Therefore, it is possible to record and reproduce the data on and from different optical discs, such as $D_{12}$ and $D_6$, each having a different recording density and a different thickness, by properly varying the numerical aperture NA.

Figure 12A:
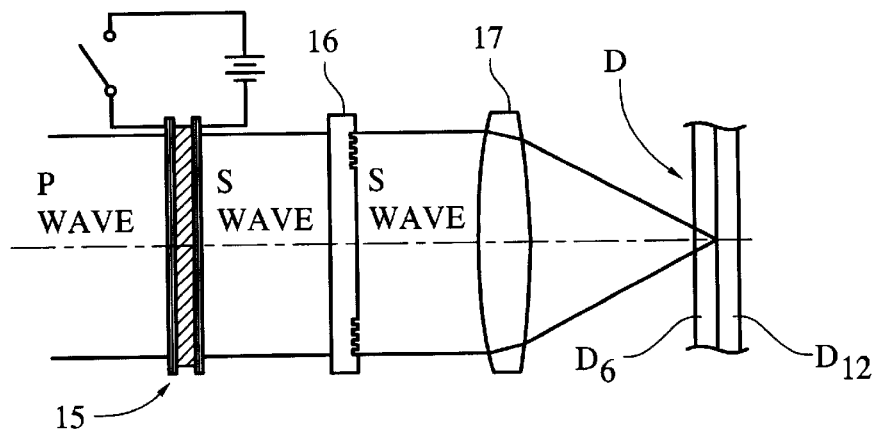
FIG. 12A is a view illustrating a state where a voltage is not supplied to a transparent electrode of the LCS to explain the principle of a numerical aperture variation for an object lens of an optical pickup apparatus according to the first embodiment of the present invention.

In more detail, if the beam which is made incident on the liquid crystal plate 15 is a P-wave, as shown in FIG. 12A, when a voltage is not supplied to the liquid crystal plate 15, the P-wave beam passes through the liquid crystal plate 15. During the passing-through of the P-wave beam, the polarization direction of the P-wave beam is changed by 90° and the beam is changed to S-wave. Since the diffraction hologram 16 has a diffraction efficiency of 0 (zero) with respect to the S-wave, the diffraction hologram 16 passes the S-wave beam from the plate 15, thus forming a spot on the optical disc $D_6$ of the DVD using the objective lens 17.

Figure 12B:
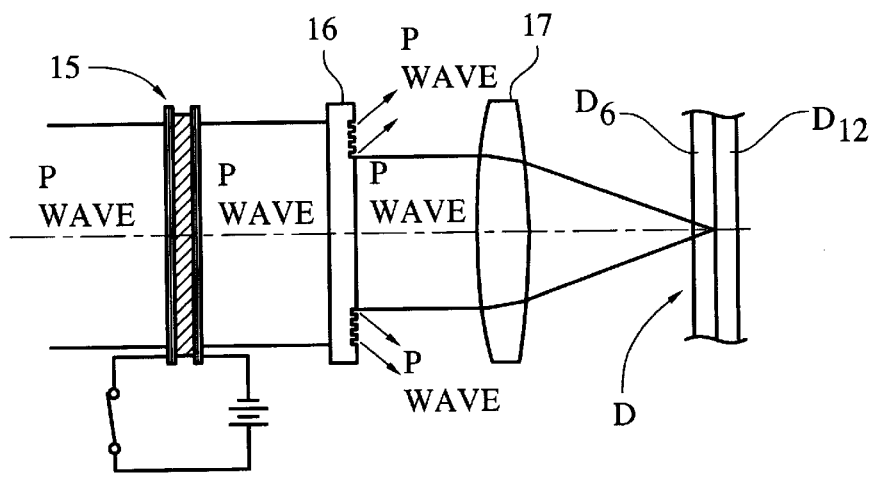
FIG. 12B is a view illustrating a state where a voltage is supplied to the transparent electrode of the LCS for explaining the principle of a numerical aperture variation for an optical pickup apparatus according to the first embodiment of the present invention.

On the contrary, as shown in FIG. 12B, when a voltage is supplied to the liquid crystal plate 15, the P-wave which is made incident on the liquid crystal plate 15 passes through the liquid crystal plate 15 unchanged. Since the diffraction hologram 16 has a high diffraction efficiency with respect to the P-wave, the beam is forwardly diffracted away from the objective lens 17, thus decreasing the numerical aperture NA and forming a spot on the optical disc $D_{12}$ of the CD using the objective lens 17.

Using the liquid crystal plate 15 and the diffraction hologram 16 of the present invention, the beam is selectively focused on the optical disc $D_{12}$ for the DVD type or the optical disc $D_6$ for the CD type. In addition, the 0-th order beam which is simply reflected from the disc D and the ±1st order beam which is diffracted from the disc D advance in the reverse direction, pass through the beam splitter 12, and are made incident on the optical detector 18 to detect the data signal.

Figure 13:
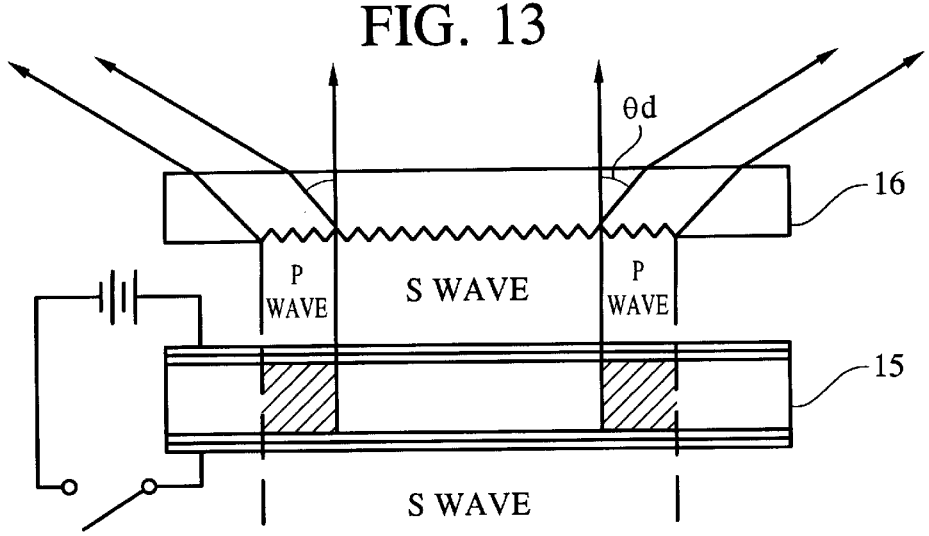
FIG. 13 is a view illustrating a state where a diffraction beam forwardly advances away from an objective lens due to a diffraction hologram of an optical pickup apparatus according to the first embodiment of the present invention.
Figure 14A:
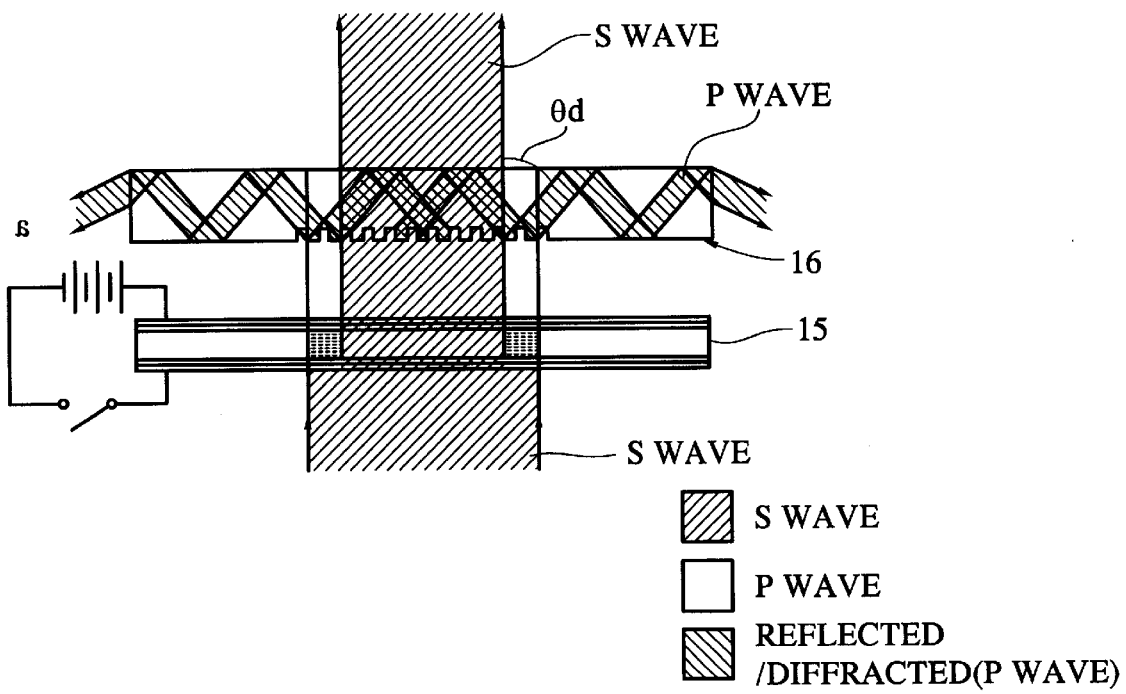
FIG. 14A is a view illustrating a state where a diffraction beam laterally advances with respect to an objective lens due to a diffraction hologram wherein a transparent electrode of a liquid crystal plate is circular.
Figure 14B:
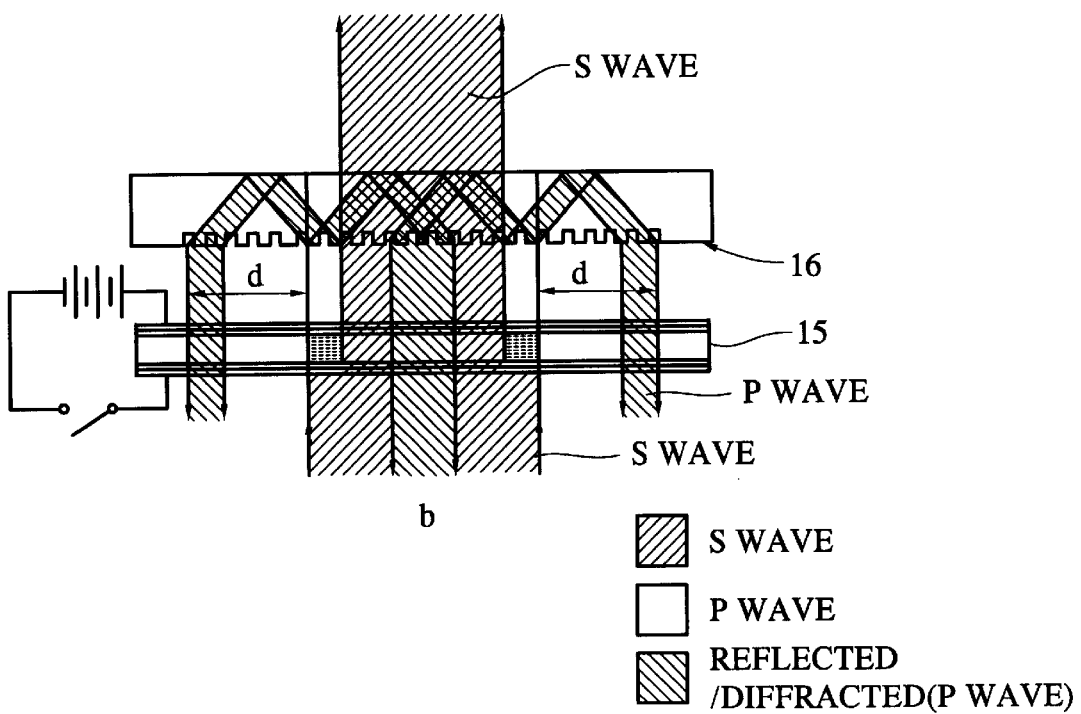
FIG. 14B is a view illustrating a state where a diffraction beam rearwardly advances from an objective lens due to a diffraction hologram wherein a transparent electrode of a liquid crystal plate is circular.

Here, as shown in FIG. 12B, the beam may be diffracted by the grating portion of the diffraction hologram 16 and may advance far from the objective lens 17. Here, it is important to control the beam not to affect the optical detector 18. The following are several methods for controlling the beam to advance away from the objective lens 17:

1) Forwardly advancing a diffraction beam away from the diffraction hologram 16 as shown in FIG. 13,
2) laterally advancing a diffraction beam from the sides of the diffraction hologram 16 as shown in FIG. 14A, and
3) rearwardly advancing a diffraction beam with respect to the diffraction hologram 16 as shown in FIG. 14B.

In more detail, as shown in FIG. 13, if the diffraction angle ($\theta d$) of the beam which is diffracted by the diffraction hologram 16 is smaller than the total reflection angle $\theta c$ (i.e., $\theta d<\theta c$), the diffraction beam laterally advances in front of the diffraction hologram 16 as shown in FIG. 12B.

If the diffraction angle $\theta d$ of the diffraction beam is grater than the angle $\theta c$ of the total reflection condition, namely if $\theta d>\theta c$, the S-waves all pass through as shown in FIG. 14A, while the P-wave is diffracted and does not pass therethrough. The P-wave is deflected within the diffraction hologram 16 many times and laterally advances in the direction "a".

FIG. 14B shows rearwardly advancing the beam incident on the diffraction hologram 16. As shown in FIG. 14B, if the size of the grating is laterally extended by a predetermined width of "d" which is more than the size of the beam passing through the diffraction member and that the condition of $\theta d>\theta c$ is satisfied, then the S-waves all pass through the hologram 16, while the P-wave is diffracted and rearwardly advanced from the diffraction hologram 16.

That is, as shown in FIG. 12B, if the grating is formed on the front surface of the diffraction hologram 16, the diffraction beam advances forwardly. In this case, it is impossible to laterally and rearwardly advance the beam with respect to the objective lens 17.

As shown in FIGS. 14A and 14B, if the grating is formed on the back side of the diffraction hologram 16, it is possible to laterally and rearwardly advance the diffracted beam with respect to the objective lens 17. However, in this case it is impossible to forwardly advance the diffraction beam as in FIG. 12B. In addition, according to the result of an experiment, if the diffraction angle $\theta d$ is greater than 0.5°, it is possible to advance the diffraction beam far away from the objective lens 17 without affecting the optical detector 18.

As described above, the optical pickup apparatus according to the first embodiment of the present invention is directed to forming a circular transparent electrode 23A of the liquid crystal plate 15, for circularly twisting the liquid crystal molecules of the liquid crystal layer 25 and providing a circular or square diffraction hologram 16.

In an optical pickup apparatus according to another example of the first embodiment of the present invention, a circular or square transparent electrode 23A is provided, for forming a circular or square liquid crystal layer 25 and a circular diffraction hologram 16, whereby it is possible to record and reproduce the data recorded on different optical discs $D_{12}$ and $D_6$, each disc having a different recording density and a different thickness, by properly varying the numerical aperture NA of the objective lens 17.

Figure 15A:
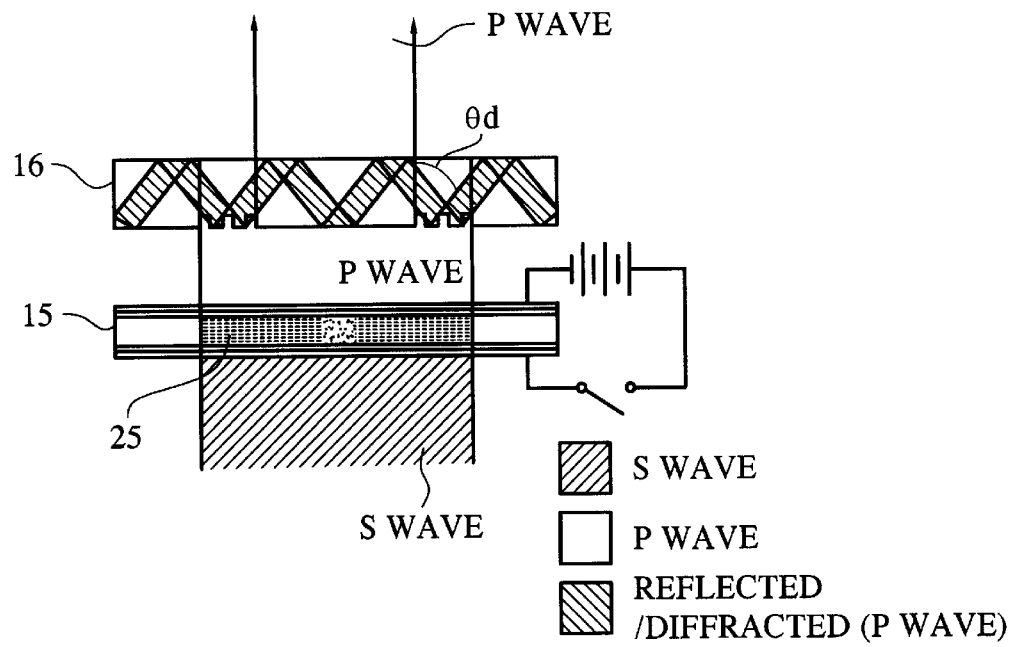
FIG. 15A is a view illustrating a state where a diffraction beam laterally advances toward an objective lens due to a diffraction hologram wherein a transparent electrode of a liquid crystal plate is circular or square.
Figure 15B:
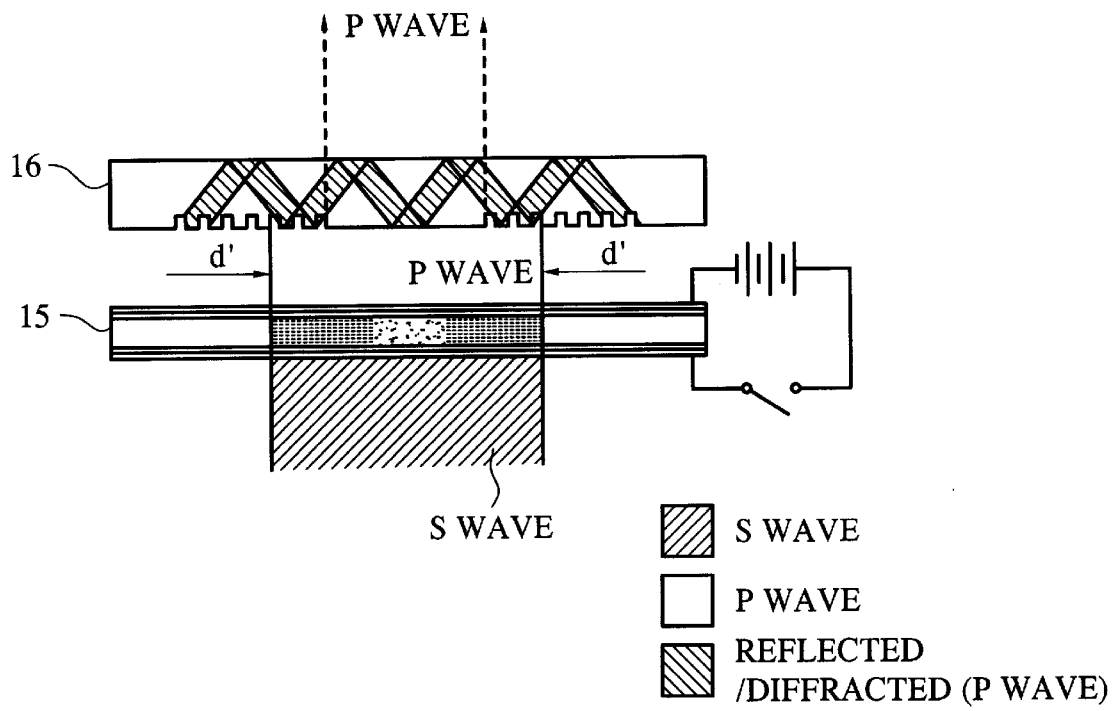
FIG. 15B is a view illustrating a state where a diffraction beam rearwardly advances from an objective lens due to a diffraction hologram wherein a transparent electrode of a liquid crystal plate is circular or square.

FIG. 15A is a view illustrating a diffraction beam laterally advancing toward an objective lens due to a diffraction hologram wherein a transparent electrode of a liquid crystal plate is circular or square, and FIG. 15B is a view illustrating a diffraction beam rearwardly advancing from an objective lens due to a diffraction hologram wherein a transparent electrode of a liquid crystal plate is circular (e.g., a ring shape) or square.

As shown in FIGS. 15A and 15B, the solid line denotes an S-wave, the hatched portion denotes a P-wave diffracted, and the broken line denotes an S-wave.

Figure 16A:
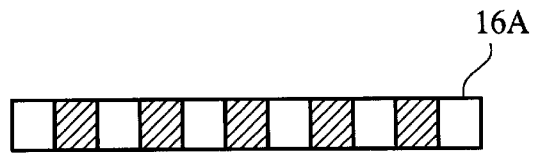
FIG. 16A is a view illustrating a grating with an index modulation, which may be used in lieu of a diffraction hologram according to the first embodiment of the present invention.
Figure 16B:
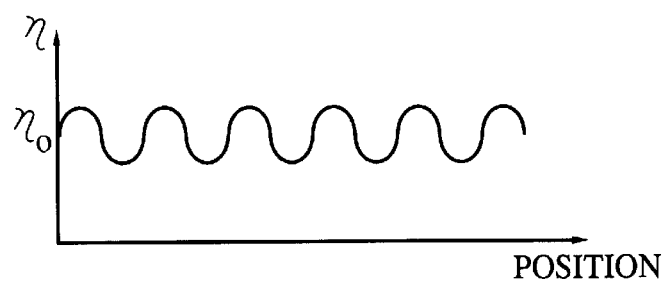
FIG. 16B is a graph showing a relationship between a diffraction efficiency and the position of the grating of FIG. 16A.

In another embodiment of the present invention, as shown in FIG. 16A, a grating 16A having an index modulation whose diffraction efficiency is varied in the system may be preferably used, instead of the diffraction hologram 16. FIG. 16B shows the transmission efficiency of the grating 16A with respect to the location of the grating 16A.

The optical pickup apparatus according to a second embodiment of the present invention will now be explained with reference to the accompanying drawings.

Figure 17:
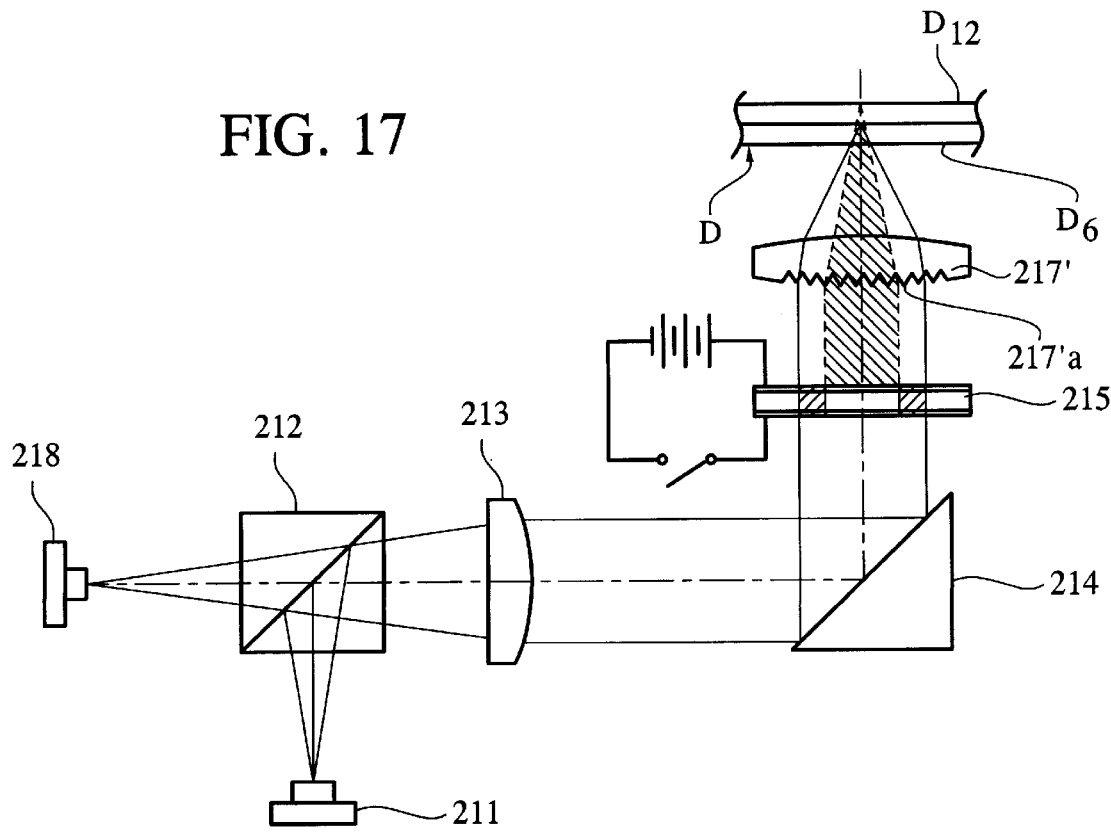
FIG. 17 is a view illustrating a construction of an optical pickup apparatus according to a second embodiment of the present invention.

As shown in FIG. 17, the construction of the optical pickup apparatus according to the second embodiment of the present invention is similar to the first embodiment of the present invention, except for the absence of a separate diffraction hologram. Namely, a diffraction hologram 217'a is integrally formed on one side of the objective lens 217', thus simplifying the construction of the system.

In more detail, the diffraction hologram 217'a is integrally formed on one side of the objective lens 217' and focuses the beam from a liquid crystal plate 215 to the pit of the optical disc D.

In addition, the optical pickup apparatus according to the second embodiment of the present invention is directed to forming a circular transparent electrode of the liquid crystal plate 215 to provide a circular liquid crystal layer. Further, a circular or square diffraction hologram 217'a of the objective lens 217' is formed. Different from the first example of the second embodiment of the present invention, in another example of the second embodiment of the present invention as shown in FIG. 18, a circular or square transparent electrode of the liquid crystal plate 225 is formed to provide a circular or square liquid crystal layer, whereby a circular diffraction hologram 227'a of an objective lens 227' may be preferably formed.

Similar to the first embodiment of the present invention, it is possible to record and reproduce data from different optical discs $D_{12}$ and $D_6$ having different recording densities and thicknesses, by selectively varying the numerical aperture NA of the objective lenses 217' and 227' using the diffraction holograms 217'a and 227'a and the liquid crystal plates 215 and 225.

In FIGS. 17 and 18, reference numeral 211 denotes a laser diode, 212 denotes a beam splitter, 213 denotes a collimator lens, 214 denotes a right-angled triangular prism, and 218 denotes an optical detector.

An optical pickup apparatus according to a third embodiment of the present invention will now be explained with reference to the accompanying drawings.

As shown in FIG. 19, a separate diffraction hologram 16 is not used in this embodiment. A diffraction hologram 315'a is directly and integrally formed within a liquid crystal plate 315' for simplifying the construction of the system.

That is, the diffraction hologram 315'a is integrally formed on one side of the liquid crystal plate 315' for converting the S-wave parallel beam reflected by the right-angled triangular prism 314 into the P-wave beam and converting the P-wave beam reflected thereby into the S-wave beam.

As shown in FIG. 19, in this embodiment of the present invention a circular transparent electrode of the liquid crystal plate 315' is formed to provide a circular liquid crystal layer. In addition, a circular or square diffraction hologram 315'a is formed in the transparent substrate of the liquid crystal plate 315'.

Figure 20:
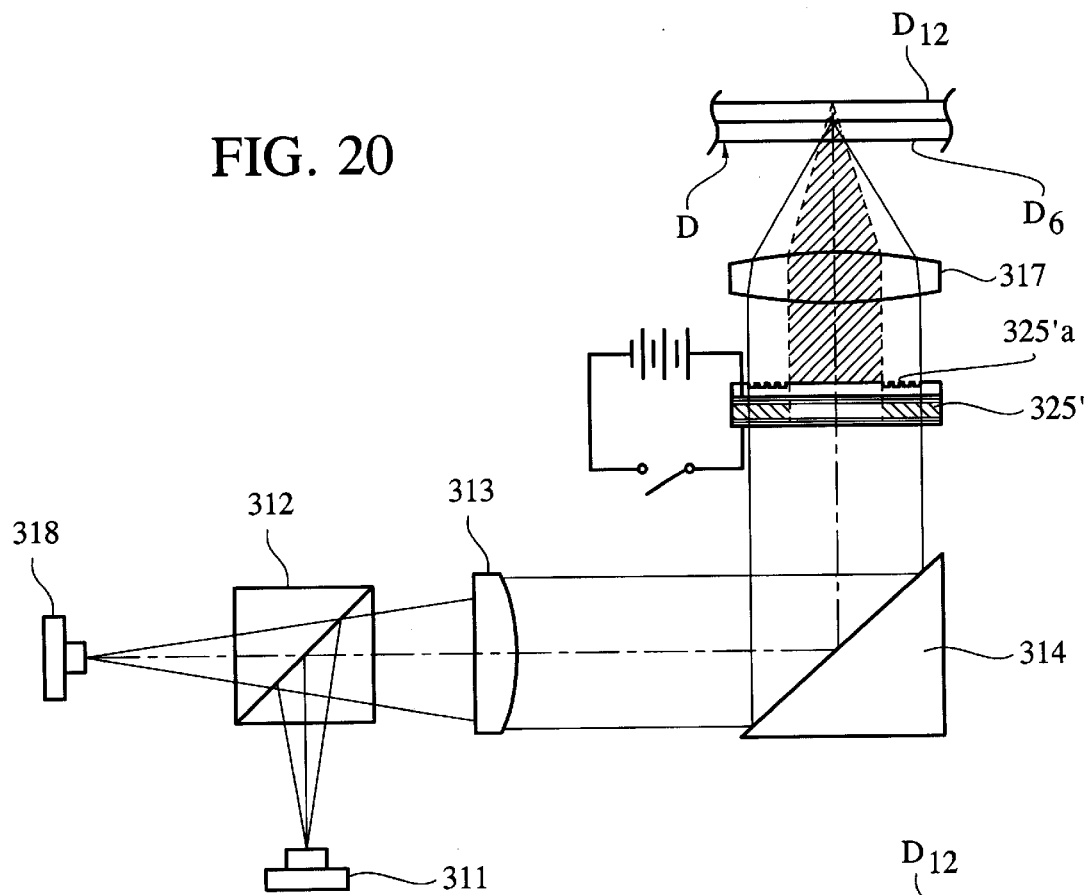
FIG. 20 is a view illustrating another example of the optical pickup apparatus of FIG. 19 according to the third embodiment of the present invention.

In another example of the third embodiment of the present invention, as shown in FIG. 20, a circular or square transparent electrode of the liquid crystal plate 325'a may be preferably formed in the transparent substrate of the liquid crystal plate 325'.

Similar to the first embodiment of the present invention, it is possible to record and reproduce data from different optical discs $D_{12}$ and $D_6$ having different recording densities and different thicknesses, by selectively varying the numerical aperture NA of the objective lens 317 using the diffraction holograms 315'a and 325'a of the liquid crystal plates 315' and 325' and the objective lens 317.

In FIGS. 19 and 20, reference numeral 311 denotes a laser diode, 312 denotes a beam splitter, 313 denotes a collimator lens, and 318 denotes an optical detector.

Figure 21:
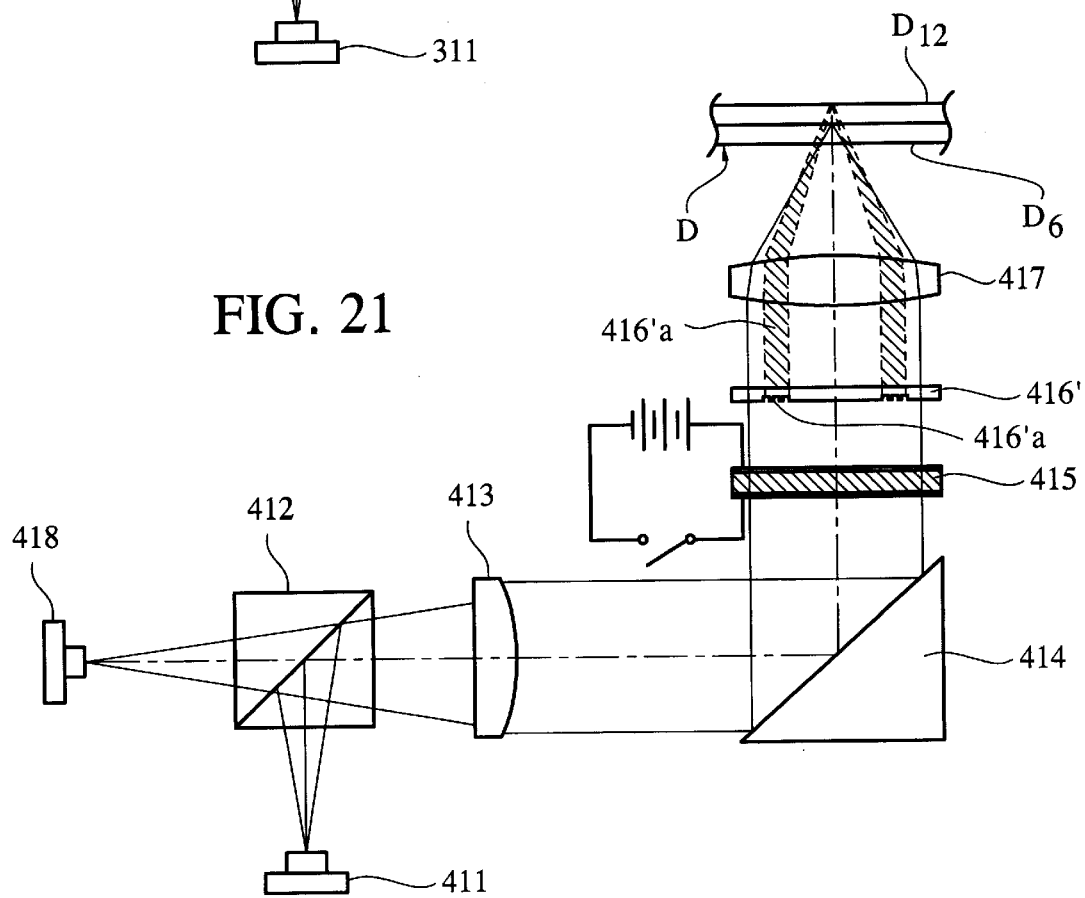
FIG. 21 is a view illustrating a construction of an optical pickup apparatus according to a fourth embodiment of the present invention.
Figure 22A:
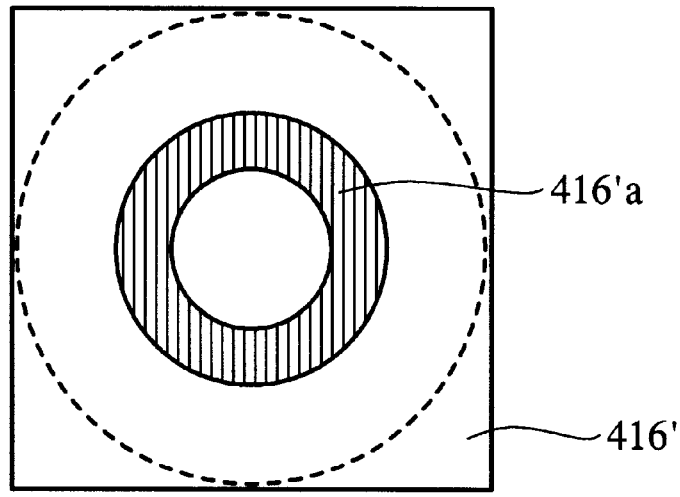
FIG. 22A is a view illustrating a diffraction hologram having one circular blocking film for an optical pickup apparatus according to the fourth embodiment of the present invention.
Figure 22B:
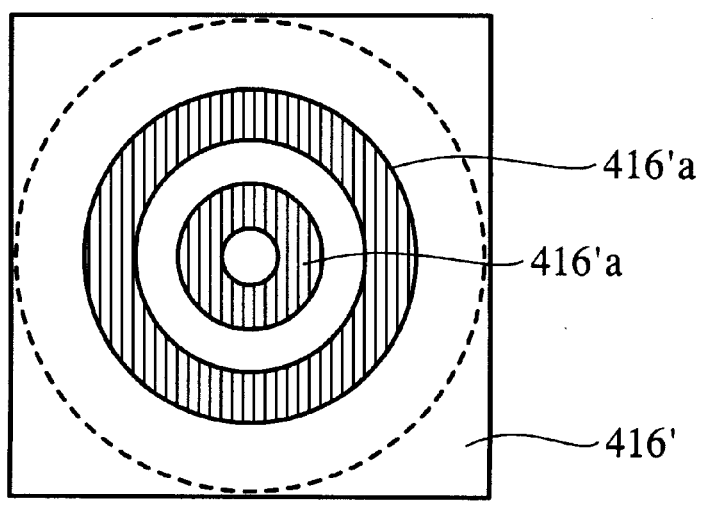
FIG. 22B is a view illustrating a diffraction hologram having a plurality of circular blocking films for an optical pickup apparatus according to the fourth embodiment of the present invention are formed.

An optical pickup apparatus according to a fourth embodiment of the present invention is directed to forming at least one circular blocking film 416'a, as shown in FIGS. 22A and 22B, in a diffraction hologram 416' for decreasing spherical aberration as shown in FIG. 21.

Figure 23:
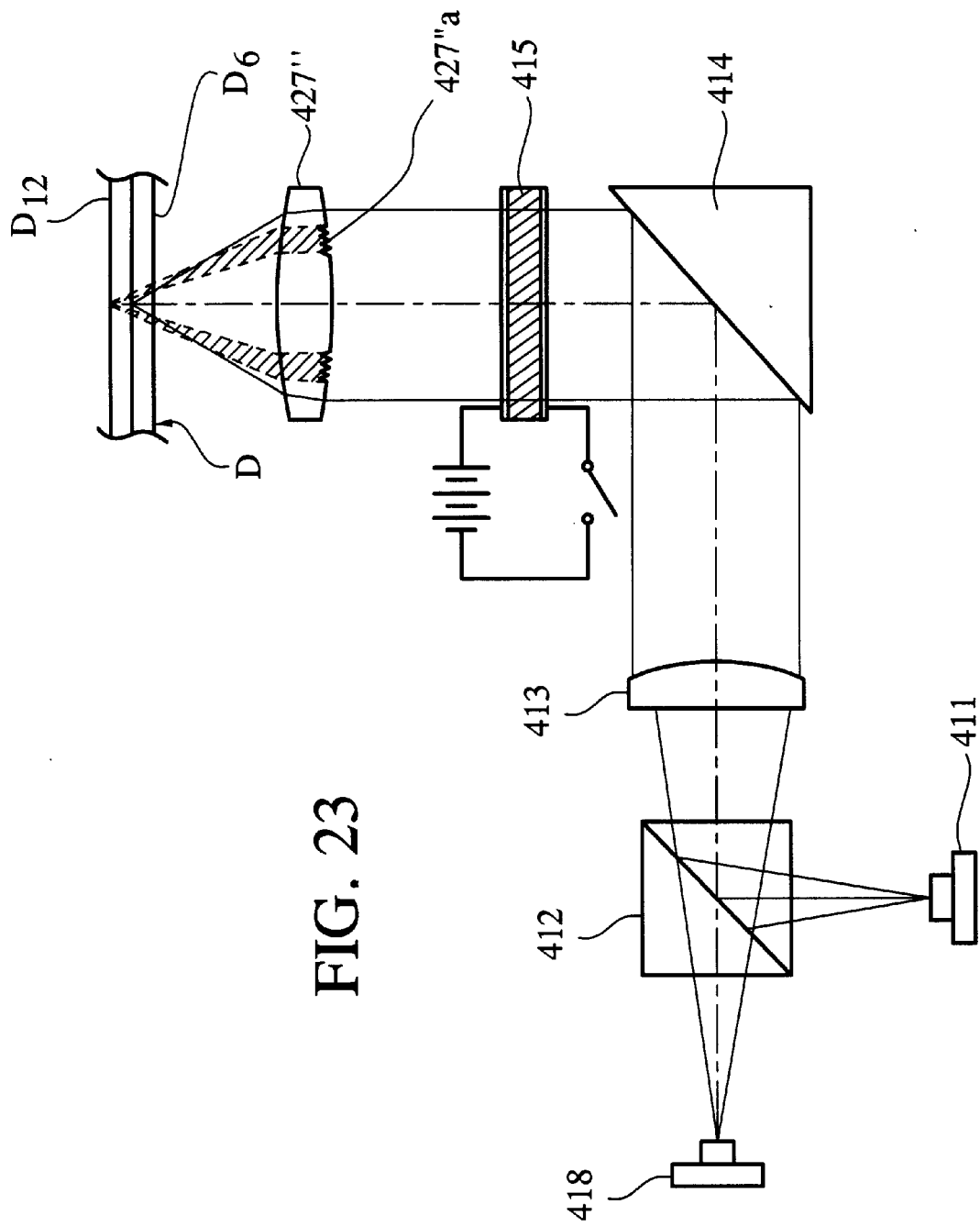
FIG. 23 is a view illustrating another example of an optical pickup apparatus according to the fourth embodiment of the present invention.

As shown in FIG. 23, in another embodiment of the present invention, at least one circular blocking film 427"a may be preferably formed on a portion of an objective lens 427" for decreasing the spherical aberration.

In the optical pickup apparatus according to the fourth embodiment of the present invention, it is possible to record and reproduce data from different optical disc $D_{12}$ and $D_6$ having different recording densities and thicknesses by selectively controlling the size of the beam by blocking certain portions of the beam corresponding to the spherical aberration, based on the circular blocking films 416'a formed on the diffraction holograms 416' and at least one circular blocking film 427"a formed on the objective lens 427.

In FIGS. 21 and 23, reference numeral 411 denotes a laser diode, 412 denotes a beam splitter, 413 denotes a collimator lens, 414 denotes a right-angled triangular prism, 415 denotes a liquid crystal shutter, and 418 denotes an optical detector.

As described above, the optical pickup apparatus according to the embodiments of the present invention is directed to recording and reading data from at least two different optical discs each having a different recording density and a different thickness, by using one optical pickup apparatus. This is achieved by using a liquid crystal shutter and a diffraction hologram as a numerical aperture control member for controlling the numerical aperture of the objective lens.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. An optical pickup apparatus, comprising:
   generating means for generating a beam toward an optical disc;
   varying means for varying a polarization direction of the beam advancing toward the optical disc, using a voltage signal;
   diffracting means for selectively diffracting the beam from the varying means to impinge the beam on the optical disc; and
   detecting means for detecting a reflected beam from the optical disc.

2. The apparatus of claim 1, wherein the diffracting means includes an objective lens having a diffraction grating formed on one side thereof.

3. The apparatus of claim 1, wherein the diffracting means is integrally formed on the varying means.

4. The apparatus of claim 1, wherein the diffracting means includes an objective lens having at least one circular blocking film formed on a portion of the objective lens for decreasing spherical aberration.

5. The apparatus of claim 1, wherein the varying means includes:
   a pair of transparent substrates;
   a pair of transparent electrodes formed between the transparent substrates; and
   a liquid crystal layer formed between the transparent electrodes.

6. The apparatus of claim 5, wherein the diffracting means includes a diffraction hologram.

7. The apparatus of claim 1, wherein the varying means includes a liquid crystal shutter having a liquid crystal therein for changing the polarization direction of the beam passing therethrough, depending on whether or not the voltage is applied thereto.

8. The apparatus of claim 6, wherein one of the transparent electrodes is formed to be circular and a diffraction pattern of the diffraction hologram is formed to be one of square and circular.

9. The apparatus of claim 6, wherein one of the transparent electrodes is formed to be one of square and circular, and a diffraction pattern of the diffraction hologram is formed to be circular.

10. The apparatus of claim 1, wherein the diffracting means includes a grating having a variable index modulation.

11. The apparatus of claim 1, wherein a diffraction angle θd of the beam which is made incident on the diffracting means is less than an angle θc of the total reflection condition.

12. The apparatus of claim 1, wherein a diffraction angle θd of the beam which is made incident on the diffracting means is greater than an angle θc of the total reflection condition.

13. The apparatus of claim 12, wherein the diffracting means includes a diffraction pattern which is larger than the size of the beam passing therethrough.

14. The apparatus of claim 1, wherein a diffraction angle θd of the diffracting means is more than 0.5°.

15. The apparatus of claim 7, wherein the diffracting means includes a diffraction hologram formed on one side of the liquid crystal shutter.

16. The apparatus of claim 1, wherein the generating means includes:

a laser diode, a beam splitter for reflecting the beam from the laser diode and transmitting the reflected beam from the optical disc onto the detecting means, a collimator lens for transmitting the beam from the beam splitter, and a prism for reflecting the beam from the collimator lens toward the varying means.

17. The apparatus of claim 16, wherein the detecting means includes a photodetector for detecting the beam transmitted through the beam splitter.

* * * * *